US005660368A

United States Patent [19]

De Matthaeis et al.

[11] Patent Number: 5,660,368

[45] Date of Patent: Aug. 26, 1997

[54] METERING VALVE FOR CONTROLLING THE SHUTTER OF A FUEL INJECTOR

[75] Inventors: Sisto De Matthaeis, Modugno; Mario Ricco, Bari, both of Italy

[73] Assignee: Elasis Sistema Ricerca Fiat Nel Mezzogiorno Societa Consortile per Azioni, Viale Impero, Italy

[21] Appl. No.: 365,586

[22] Filed: Dec. 28, 1994

[30] Foreign Application Priority Data

Dec. 30, 1993 [IT] Italy .................................. TO93A1021

[51] Int. Cl.[6] ............................ F16K 31/02; F02M 47/02; F02M 51/00

[52] U.S. Cl. .................... 251/30.02; 123/467; 239/585.1

[58] Field of Search .................................... 123/548, 467; 239/96, 124, 533.8, 533.9, 585.1, 585.3, 585.4, 585.5; 251/30.01, 30.02, 30.05

[56] References Cited

U.S. PATENT DOCUMENTS

| | | | |
|---|---|---|---|
| 3,913,357 | 10/1975 | Ziesche et al. | 239/585.5 |
| 4,946,106 | 8/1990 | Turchi et al. | 123/458 |
| 5,011,082 | 4/1991 | Ausiello et al. | 239/585.1 |
| 5,067,658 | 11/1991 | De Matthaeis et al. | 239/585.1 |
| 5,125,575 | 6/1992 | Iwanaga | 239/96 |
| 5,219,122 | 6/1993 | Iwanaga | 239/585.1 |
| 5,244,150 | 9/1993 | Ricco et al. | 239/96 |
| 5,246,165 | 9/1993 | De Matthaeis et al. | 239/96 |
| 5,395,048 | 3/1995 | Ricco et al. | 239/96 |
| 5,472,142 | 12/1995 | Iwanaga | 239/96 |

*Primary Examiner*—George L. Walton
*Attorney, Agent, or Firm*—Ladas & Parry

[57] ABSTRACT

A metering valve has a valve body with a control chamber, a pressurized fuel supply conduit and a fuel drain conduit. A control rod of a shutter includes an element for hydraulically affecting the fuel supply conduit and the fuel drain conduit so that fuel drainage is considerably reduced. The control rod slides in a first cylindrical portion of the control chamber. A second portion of the control chamber that is coaxial with the first portion forms an annular shoulder against which the element is arrested. The fuel supply conduit is located radially of the first portion, and the fuel drain conduit is located axially of the second portion of the control chamber.

5 Claims, 2 Drawing Sheets

METERING VALVE FOR CONTROLLING THE SHUTTER OF A FUEL INJECTOR

BACKGROUND OF TEE INVENTION

The present invention relates to a metering valve for controlling the shutter of a fuel injector, in particular an internal combustion engine injector.

The metering valves of fuel injectors normally comprise a control chamber having a pressurized fuel supply conduit, and a drain conduit for draining fuel from the control chamber. The drain conduit is normally closed by the armature of an electromagnet, and is opened when the electromagnet is energized.

As is known, the parameters determining the efficiency of a metering valve are the drainage of fuel from the valve to the tank, and the response time of the valve when the drain conduit is closed.

In known metering valves, a fairly large drainage of fuel occurs, due to the drain conduit remaining fully open throughout operation of the electromagnet, during which time the pressure in the control chamber remains low. Moreover, response of the injector, in the closure phase, is invariably sluggish by depending on the time taken to restore the pressure in the control chamber.

A metering valve has been devised wherein the shutter control rod, when moved upon operation of the electromagnet, partially closes the supply conduit to reduce the amount of fuel recycled to the tank during injection. The reduction achieved, however, is insufficient, in that fuel continues to flow along the partly closed supply conduit throughout injection.

SUMMARY OF THE INVENTION

It is an object of the present invention to provide a highly straightforward, reliable metering valve of the aforementioned type, designed to minimize the amount of fuel recycled at each injection cycle, and so overcome the aforementioned drawbacks typically associated with known valves.

According to the present invention, there is provided a metering valve for controlling the shutter of a fuel injector, comprising a body with a control chamber; a supply conduit for feeding pressurized fuel into said chamber; and a drain conduit for draining fuel from said chamber; characterized in that said shutter is provided with an element for hydraulically separating said supply conduit and said drain conduit, so that fuel drainage is considerably reduced.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
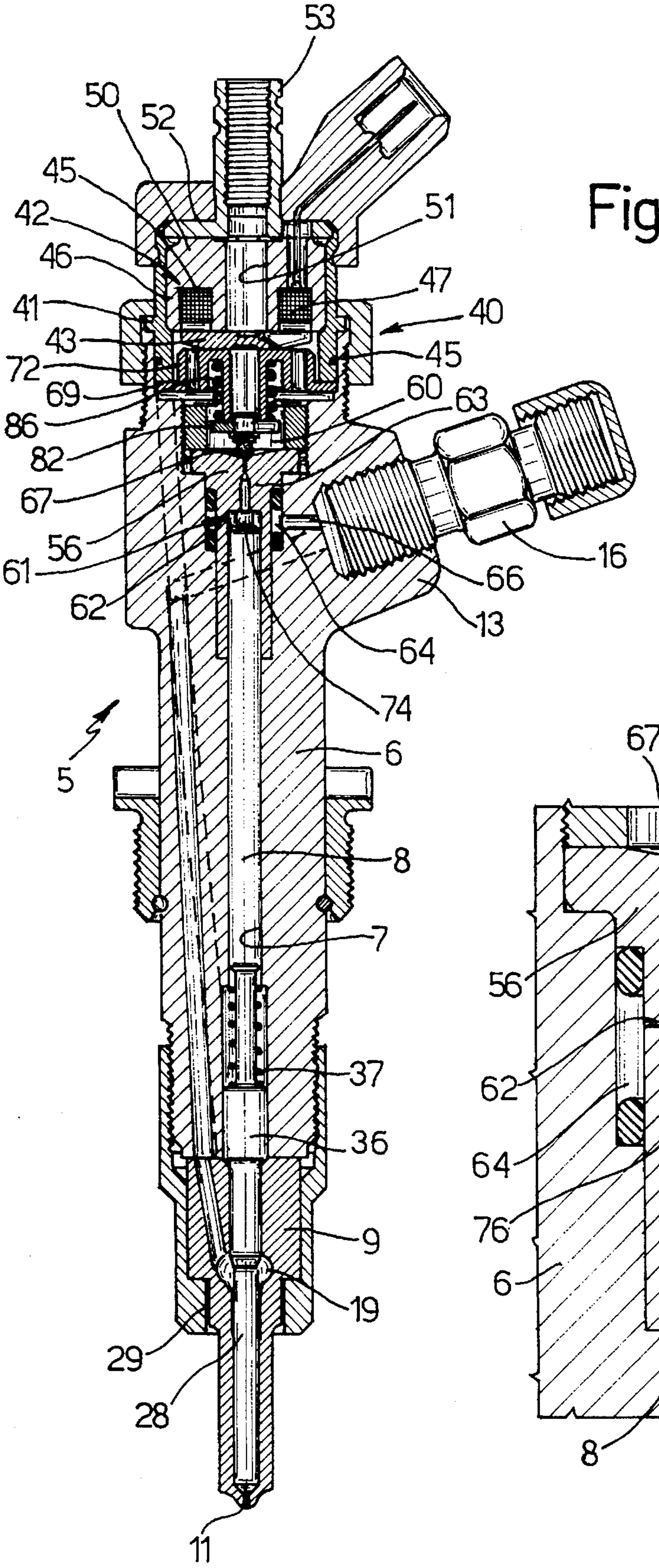
FIG. 1 shows a half section of a fuel injector featuring a metering valve in accordance with the present invention.
Figure 2:
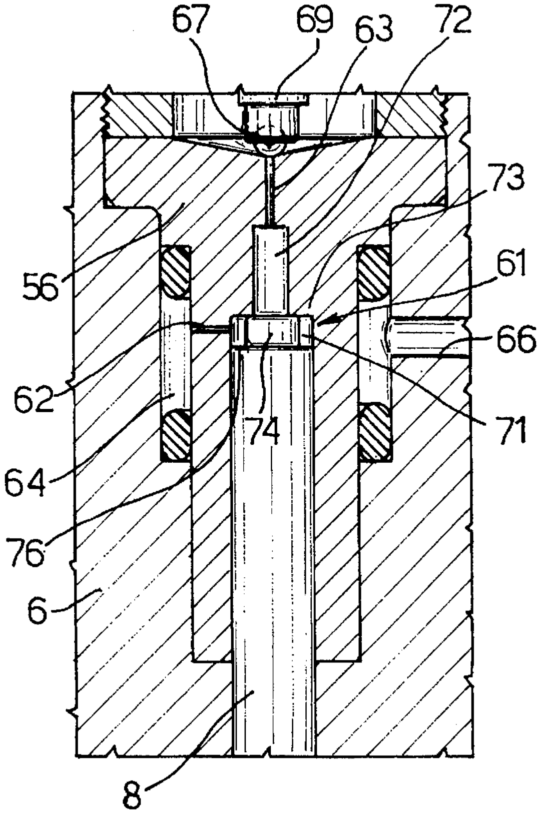
FIG. 2 shows a larger-scale section of a detail in FIG. 1.

Number 5 in FIG. 1 indicates a fuel injector, e.g. for a diesel internal combustion engine, comprising a hollow body 6 having an axial cavity 7 in which slides a control rod 8. At the bottom, body 6 is connected to a nozzle 9 terminating with an injection orifice 11 normally closed by a shutter consisting of the tip of a pin 28 connected to rod 8.

Body 6 also presents a hollow appendix 13 housing an inlet fitting 16 connected to a normal high-pressure, e.g. 1200 bar, fuel supply pump. The fuel is fed along internal conduits to an injection chamber 19; and pin 28 presents a shoulder 29 on which the pressurized fuel in chamber 19 acts. A compression spring 37 contributes towards pushing pin 28 downwards.

Injector 5 also comprises a metering valve 40 in turn comprising a fixed sleeve 41 for supporting an electromagnet 42 controlling a disk-shaped armature 43. Electromagnet 42 comprises a fixed core 46 having a central hole 51 and an annular seat 45 housing a normal electric activating coil 47. Sleeve 41 also connects a disk 52 in one piece with a drain fitting 53 aligned with axial hole 51 in core 46 and connected to the fuel tank.

Metering valve 40 also comprises a valve body or head 56 (FIG. 1) housed inside a seat in body 6, coaxial with cavity 7, and which defines downwards a bottom drain chamber 60 extending axially in the body 6 from the upper surface of head 56 to the lower surface of core 46.

Head 56 also presents a control chamber 61 communicating with a calibrated radial supply conduit 62, and with a calibrated axial drain conduit 63. Supply conduit 62 communicates with conduit 16 via an annular chamber 64 and a radial conduit 66 in body 6; and control chamber 61 is defined at the bottom by the upper surface of rod 8.

By virtue of the larger area of the upper surface of rod 8 as compared with that of shoulder 29, the pressure of the fuel, together with spring 37, normally keeps rod 8 and pin 28 in such a position as to close orifice 11 of nozzle 9. Drain conduit 63 of control chamber 61 is normally closed by a shutter comprising a ball 67 on which stem 69 of armature 43 acts; and drain chamber 60 communicates with axial hole 51 in core 46 and consequently with drain fitting 53. Stem 69 of armature 43 presents a flange 82 supporting an armature return spring 86.

Electromagnet 42 is normally de-energized, so that armature 43 is held by return spring 86 in the down position in FIG. 1; stem 69 keeps ball 67 in the position closing drain conduit 63; control chamber 61 is pressurized and, together with the action of spring 37, overcomes the pressure on shoulder 29 so that rod 8 is held down together with pin 28 which closes orifice 11.

When electromagnet 42 is energized, armature 43 is raised and stem 69 releases ball 67; the fuel pressure in chamber 61 falls so as to open metering valve 40 and discharge the fuel into drain chamber 60 and back into the tank; the fuel pressure in injection chamber 19 now overcomes the force exerted by spring 37, and so raises pin 28 to open orifice 11 and inject the fuel in chamber 19.

When electromagnet 42 is de-energized, armature 43 is restored to the down position by spring 86, so that ball 67 again closes drain conduit 63; the pressurized incoming fuel from conduit 62 restores the pressure inside control chamber 61; and pin 28 moves back down to close orifice 11.

According to the present invention, control chamber 61 comprises a first cylindrical portion 71 in which the top end of rod 8 slides axially; and a second portion 72 coaxial with and separated from portion 71 by an annular shoulder 73. Supply conduit 62 is located radially at portion 71, and drain conduit 63 axially at portion 72.

The top end of rod 8 presents a cylindrical appendix 74 coaxial with and smaller in diameter than rod 8 on which it forms an annular surface 76. Appendix 74 is arrested against shoulder 73 so as to hydraulically separate, i.e. substantially cut off communication between, portions 71, 72 and hence calibrated conduits 62, 63.

The arrangement of portions 71, 72 of chamber 61 and appendix 74 of rod 8 provides, at each injection cycle, for minimizing the drainage of fuel from metering valve 5 to the tank. This in fact is substantially limited to the fuel along conduit 63, until appendix 74 of rod 8 is arrested against shoulder 73, after which, drainage is negligible, being limited to the fuel filtering between appendix 74 and shoulder 73, so that total drainage during injection is substantially independent of the duration of the injection phase.

During the final upward travel portion of rod 8, appendix 74 gradually closes portion 72 so as to separate it hydraulically from portion 71. As a result, the pressure in portion 71 begins to rise, thus exerting a braking effect on rod 8, and so reducing end-of-travel impact of rod 8 and component wear.

When closed, atmospheric drain pressure is established in portion 72, while a pressure slightly less than the fuel supply pressure is established in portion 71. When electromagnet 42 is de-energized and conduit 63 closed by ball 67, the fuel pressure in portion 72 begins to rise and, together with the pressure of portion 71 on annular surface 76 of rod 8 and the action of spring 37, so acts on appendix 74 as to rapidly lower rod 8 and pin 28 and so close orifice 11 of nozzle 9.

Figure 3:
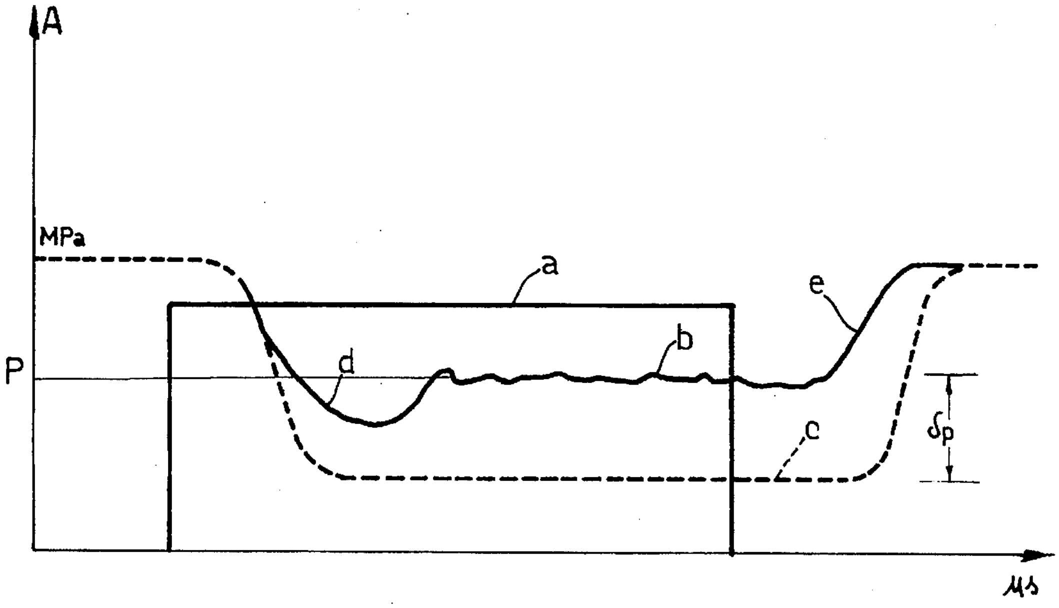
FIG. 3 shows a comparative graph of an operating characteristic of the valve.

Tests have shown that, upon electromagnet 42 being de-energized, the response time of rod 8 is reduced by at least 20%. FIG. 3 shows a graph "a" of the energizing current of electromagnet 42 as a function of time in μs, and presents a continuous-line curve "b" indicating the pressure, expressed in MPa (megapascals), in control portion 72 of chamber 61; and a dotted-line curve "c" indicating the pressure in chamber 61 of a conventional injector with no hydraulic separation of supply conduit 62 and drain conduit 63.

As can be seen, during injection, the pressure in curve "b" stabilizes at a value P greater by a value δp of at least 20 MPa as compared with that of curve "c"; and curve "b" presents a portion "d" corresponding to closure of portion 72, in which the pressure in portion 72 during the transient state first falls slightly below, but is immediately restored to, value P; and a portion "e" in which, upon electromagnet 42 being de-energized, the pressure in portion 72 is restored more rapidly than in curve "c".

Figure 4:
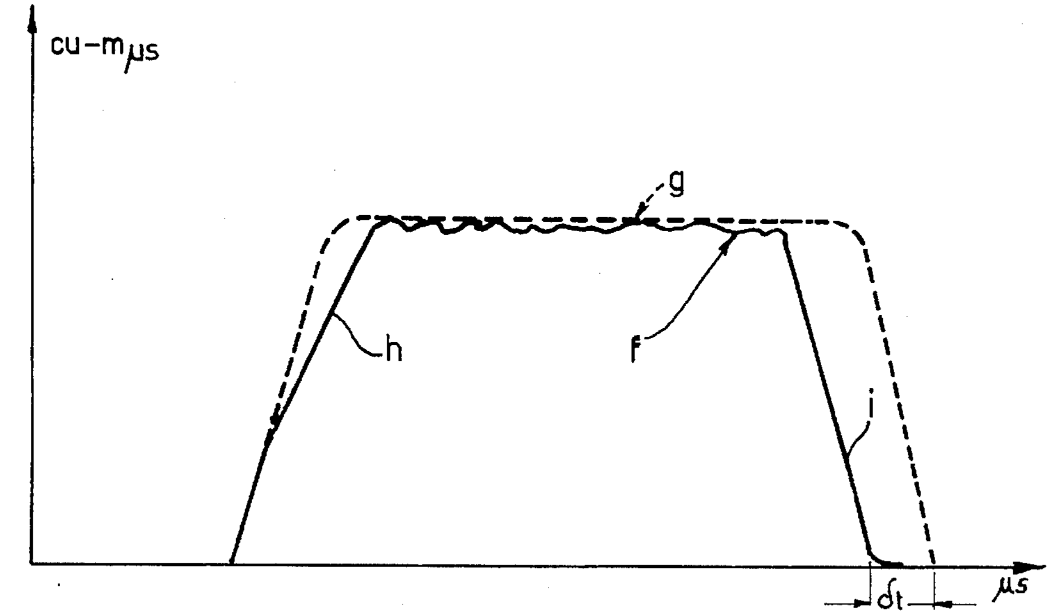
FIG. 4 shows a comparative graph of a further operating characteristic of the valve.

The FIG. 4 graph shows a continuous-line curve "f" indicating, as a function of time and in cu.mm/μs, the amount of fuel injected through orifice 11 at each injection cycle; and a dotted-line curve "g" indicating the amount of fuel injected through orifice 11 in the absence of hydraulic separation of supply conduit 62 and drain conduit 63.

As can be seen, curve "f" presents an initial portion "h" in which delivery increases more slowly as compared with curve "g"; and a final portion "i" in which, upon electromagnet 42 being de-energized, conduit 63 is closed more rapidly, thus resulting in a reduction δt in the closing time of pin 28.

The advantages of the metering valve according to the present invention are as follows. Firstly, it provides for minimizing fuel drainage at each injection cycle; secondly, for reducing the response time of rod 8 when electromagnet 42 is de-energized; and, thirdly, for braking and so reducing Wear of rod 8.

Clearly, changes may be made to the metering valve as described and illustrated herein without, however, departing from the scope of the claims. For example, the control chamber may be designed differently from that described; changes may be made to the volume ratio of the two portions of chamber 61; and portion 72 of chamber 61, adjacent to drain conduit 63, may even be eliminated.

We claim:

1. A metering valve for controlling the shutter of a fuel injector, comprising:

a body (56);

a control chamber (61) provided in said body (56), said chamber (61) comprising a first cylidrical portion (71) provided with a supply conduit for feeding pressurized fuel into said chamber (61), and a second portion (72) provided with a drain conduit (63) for draining fuel form said chamber (61), said body (56) comprising a shoulder (73) disposed within said chamber (61) and located on a plane separating said first portion (71) from said second portion (72), a cylindrical rod (8) sliding into said first portion (71); and an element (74) integral with an end of said rod movably disposed within said chamber (61) for arresting against said shoulder (73) so as to hydraulically separate said portions (71, 72) and to cut off communication between said supply conduit (62) and said drain conduit (63), whereby the fuel drainage from said chamber (61) is reduced, the time required to re-activate said shutter (28) is limited to that required for pressurizing said second portion (72) and pressure in said portion (71) risen as said element (74) approaches said shoulder (73) to exert a braking effect on said rod (8) for reducing end-of-travel impact of said rod (8) and consequent wear of said element (74) and said shoulder (73).

2. A valve as claimed in claim 1, wherein said second portion (72) is coaxial with and smaller in diameter than said first portion (71); said element consisting of a cylindrical appendix (74) of said rod (8), said shoulder (73) between said two portions (71, 72) being angular.

3. A valve as claimed in claim 2, characterized in that said drain conduit (63) is located at said second portion (72) coaxially with said chamber (61); said supply conduit (62) being positioned radially at said first portion (71).

4. A valve as claimed in claim 2, characterized in that said appendix (74) is coaxial with said rod (8), and is so sized as to form on said rod (8) an annular surface (76) on which the pressurized fuel in said first portion (71) acts; said surface (76) being sufficient to close said shutter (28).

5. A valve as claimed in claim 2, wherein said first portion (71) and said appendix (74) are so sized that, when said appendix is so arrested, the fuel pressure in said first portion (71) is rapidly increased and partially brakes said rod (8).

* * * * *